INVENTOR:
Leroy Kaufold
By Hubert E. Metcalf
His Patent Attorney

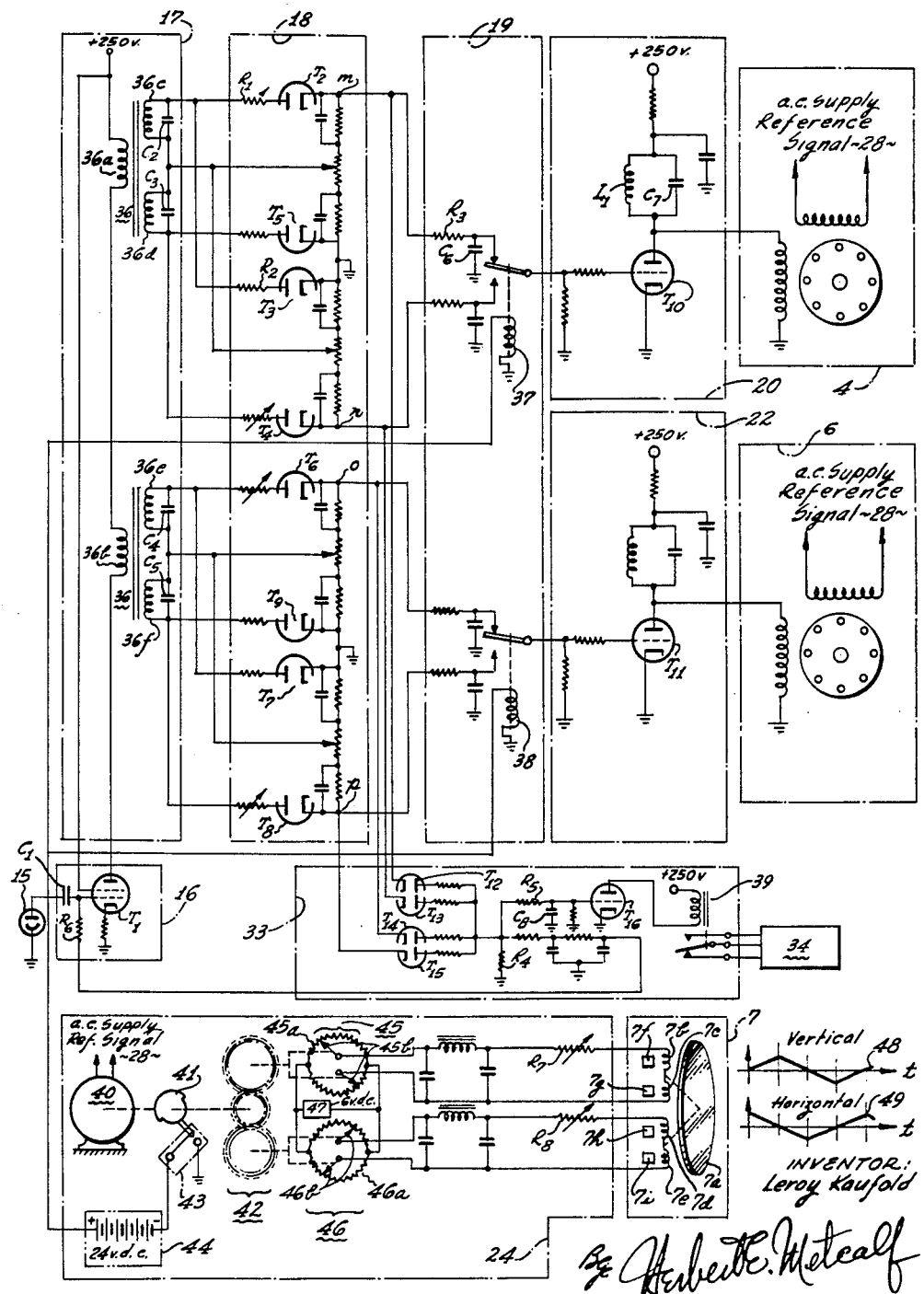

United States Patent Office 3,088,033
Patented Apr. 30, 1963

3,088,033
AUTOMATIC MULTIPLE GRID SCANNING TRACKER
Leroy Kaufold, Santa Barbara, Calif., assignor to Northrop Corporation, Hawthorne, Calif., a corporation of California
Filed Aug. 31, 1953, Ser. No. 377,447
13 Claims. (Cl. 250—203)

This invention relates generally to automatic trackers for tracking radiant source objects such as a star and more particularly to an automatic tracking system using an oscillating mirror and a stationary multiple grid scanning system for tracking radiant source objects.

The presence of the sun in the daytime renders the problem of star tracking much more difficult than nighttime tracking since, in general, there is only the moon to contend with at night and it is of far less brightness than the sun. However, when a star is being tracked near the moon at night, sky gradient presents disturbances that cannot be ignored. It is evident that a 24 hour tactical star tracker must overcome a wide range of obscuring (blanketing) light to derive a useful signal.

It is an object of this invention to provide scanning means and a control network for an automatic star tracker which discriminates against obscuring noise signals.

It is another object of the invention to provide scanning means for modulating the star signal in a manner suitable for separation from other signals.

Another object of the invention is to provide control network and photosensitive means responsive during all hours for star tracking.

A further object of the invention is to provide new means for establishing elevation and azimuth error signals for accurate positioning of a tracking telescope.

Briefly, the foregoing and other objects are preferably accomplished by providing a sighting mirror positionable in elevation and azimuth and cooperating with a reflecting type telescope carrying an oscillating mirror therein to displace a star image in a closed path over the face of a stationary grid located at the focal plane of the telescope. The grid is divided into a plurality of equal sections, each section having alternate clear and opaque spacings across which is moved the star image. The number of spacings are different for each section such that a different pulse frequency is generated from a photocell located behind the grid as the star image traverses each section. The photocell is preferably infrared sensitive and puts out a different series of pulses for each section in a sequence according to the star path traced around the grid. The pulses from the photocell are amplified and passed through a filter having a plurality of channels, each channel being responsive only to the pulse frequency of a corresponding grid section. When the star is on center, a plurality of different frequency signals of equal duration appear in consecutive time sequence from each filter channel and are rectified. The rectified signals are suitably time delayed and variously grouped in opposing sense to control the orientation of the sighting mirror. The signals of each group produce relative opposing motion of the sighting mirror; hence, when all frequencies are equally provided, a constant null is retained by suitable damping. When the star is off center, the opposing signals in a group are unbalanced, resulting in the reorientation of the sighting mirror until equal outputs are secured. The rectified outputs of the different frequencies are also utilized to provide a variable bias for control of gain and auxiliary circuitry.

The invention will be more fully understood by reference to the accompanying drawings, in which:

FIGURE 4 is a detailed wiring diagram of a preferred control network for the automatic multiple grid tracker.

Figure 1:
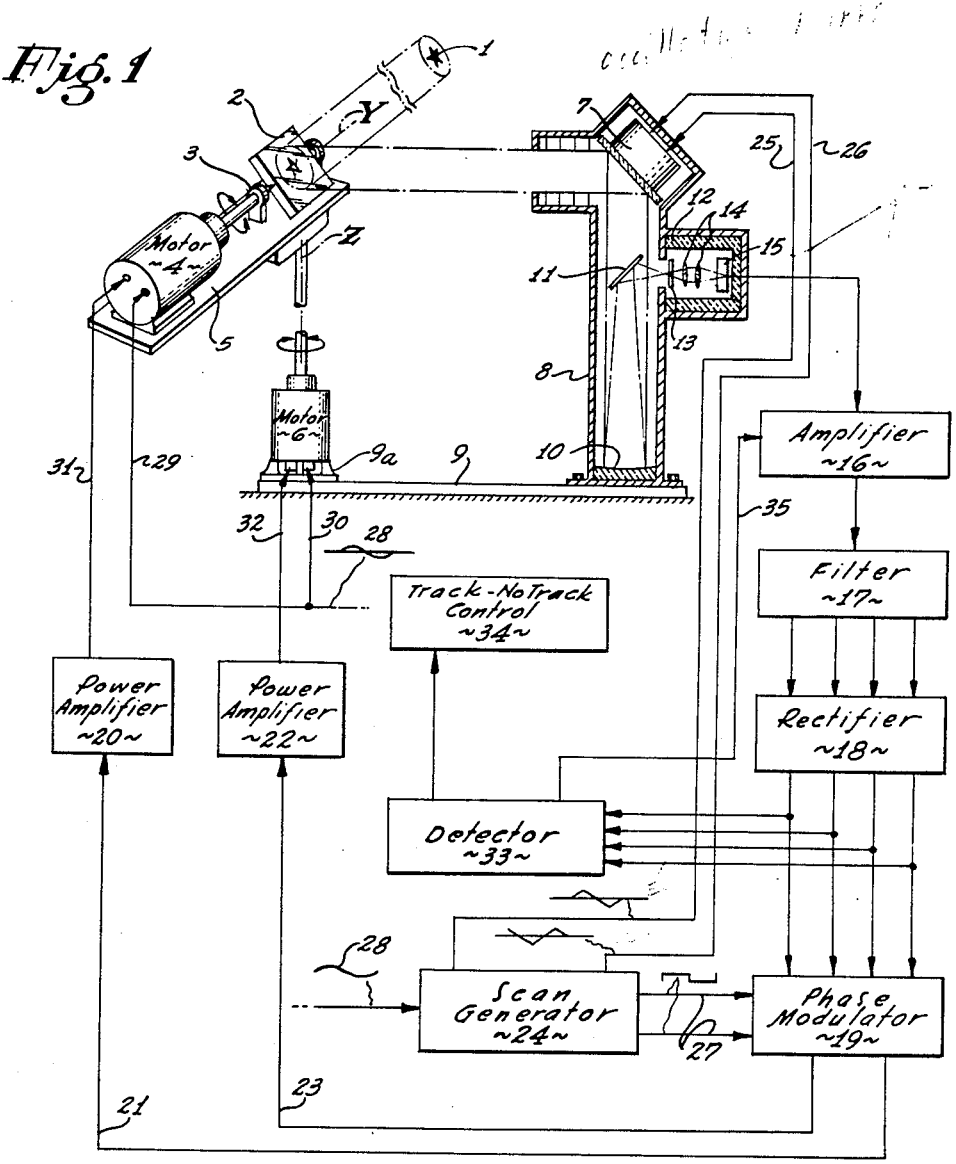
FIGURE 1 is a diagrammatic block perspective of a preferred embodiment of an automatic radiant source object tracker.

Referring first to FIGURE 1, there is shown a schematic block diagram illustration of a preferred embodiment of an automatic tracking system. A star 1 for example, is the radiant source object to be tracked in this case. Star 1 is sighted by a mirror 2 which is rotatable about two axes, designated Y and Z, which are the elevation and azimuth rotation axes, respectively. The mirror 2 is actually suspended in a yoke 3 which also carries elevation drive motor 4 on a platform 5 rigidly attached to yoke 3. This permits azimuth drive motor 6 to function independently of interaction with the elevation control by driving the entire yoke assembly. The star image reflected by mirror 2 is intercepted by an oscillating mirror assembly 7 mounted at 45 degrees to the optical axis of a reflecting telescope 8, which is firmly mounted on a stable platform 9. Azimuth drive motor 6 is fastened to a bracket 9a which is in turn attached to platform 9. The star image reflected by the oscillating mirror assembly 7 is further reflected by a lower concave telescope mirror 10, and is again reflected by a small, centrally located plane mirror 11 which is also mounted at 45 degrees with the telescope optical axis above concave mirror 10 to deflect the star image out of the telescope housing through an aperture in the side thereof. An insulated container 12 is attached to this opening as shown. Just following the aperture is mounted a multiple section grid 13 having four equal square sections, for example, and located at the focal plane of the telescope mirror 10. A set of collimating lenses 14 is located behind the grid 13 and before photocell 15, which is for example a lead sulfide, infrared sensitive cell. Container 12 is a double walled enclosure packed between the walls with ethylene dichloride frozen solid at −70° C. The latent heat of fusion of ethylene dichloride yields a refrigerating action in container 12 which is necessary to keep the lead sulfide cell in a condition of maximum sensitivity.

The output of the lead sulfide cell, which is normally comprisced of four different series of pulses, is fed to amplifier 16 as indicated in the single line diagram of FIGURE 1. The output of the amplifier 16 is applied to filter 17, which has four tuned channels each responsive to a frequency due to a corresponding grid section. The outputs of the four tuned channels are grouped into pairs of two by pairing of tuned channels for up-and-down and left-and-right movement control of the sighting mirror 2, as will be more fully described later. This output is rectified by a rectifier 18 and fed to a phase modulator 19 which suitably filters and chops the D.C. signal. At the same time a rectified signal is converted into an alternating signal, it is compared in polarity (phase) with a reference frequency signal. The pair of signals which control up-and-down motion of mirror 2, is fed through a line 21, amplified by power amplifier 20, and is used to energize elevation drive motor 4 according to the output of phase modulator 19. Similarly, the signal pair controlling left-and-right motion of mirror 2 is fed through a line 23, amplified by power amplifier 22, and used to energize azimuth drive motor 6 in accordance with the output from phase modulator 19.

The reference frequency signal with which the rectifier 18 output is compared is produced by a scan generator 24. This is called a scan generator because it also produces the horizontal and vertical drive signals which are applied to the oscillating mirror assembly 7 through lines 25 and 26. These signals cause the mirror of assembly 7 to oscillate in a pattern by which the star image traces a square path diagonally about the center of grid 13 when the star 1 is directly sighted by mirror 2. The reference frequency signal is applied to phase modulator 19 through lines 27 and is a square wave derived from a sine wave reference signal 28 of the same frequency supplied to scan generator 24. Reference signal 28 is also supplied, in phase, to a field of both drive motors 4 and 6, as shown. These motors can be two-phase servomotors, for example, one phase being connected directly to an A.C. power supply providing reference signal 28 as indicated in FIGURE 1 by lines 29 and 30. Lines 31 and 32 are connected to the other phase of each respective sermomotor, the A.C. signal phase in these lines being determined by the output of phase modulator 19. When all four grid frequencies have equal durations each scan cycle, the opposing signals of a grouped pair cancel the effect of each other and there is no output from phase modulator 19. When the star image is off center, however, the opposing signals are unbalanced and an output appears from phase modulator 19 which is amplified and applied to the drive motors to eliminate the error. In this way the mirror 2 is controlled in both elevation and azimuth whereby the star 1 is continuously tracked. The rotation axes of mirror 2 can be calibrated in degrees from arbitrary reference points such that start altitude and hour angle are indicated on two different dials (not shown) if desired.

The rectifier 18 output is further provided to detector 33 which detects whether there is any output from rectifier 18. In the absence of an output, this would mean that the star is outside the field of view and the output of detector 33 vanishes. This loss of output trips the track-no-track control 34 to initiate a search procedure through auxiliary equipment. The detector 33 output is also fed back on line 35 to bias the amplifier 16 controlling the gain thereof. This connection insures that the star or point source signal is maintained at a fairly constant magnitude to filter 17. This is done by having the signal fed back to bias the amplifier 16 such as to increase the gain when the star signal is weakened and conversely when the signal is strengthened.

Figure 2:
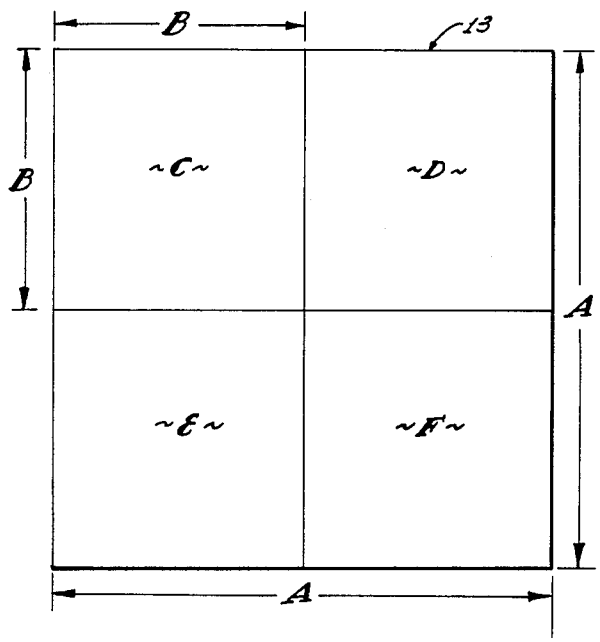
FIGURE 2 is an enlarged, frontal view of a multiple section grid illustrating a preferred grid configuration.

An enlarged frontal view of grid 13 is shown in FIGURE 2. The shape of the grid is that of a square having an edge dimension A of .36 inch, for example. The grid 13 is preferably divided into four equal square sections each having a side dimension B of .18 inch in this example. The four sections have been labeled C, D, E and F, as shown. The grid is photographically reproduced on a thin, flat plate of glass to provide accurately separated opaque stripes across each section. These stripes run parallel to an edge of the grid 13 and are clearly shown in FIGURE 3, which is a greatly magnified view of the center portion of grid 13. Each section, there shown, has a different number of stripes. The alternate clear spaces which separate the stripes have the same width as a stripe for each grid section. The oscillating mirror of assembly 7 (FIGURE 1) has two degrees of freedom. By exciting the assembly 7 with suitable signals controlling, say, horizontal and vertical deflections, the image of star 1 can be made to trace a square path G, which is shown by a broken line in FIGURE 3, diagonally across each grid section about the center of the grid 13 when the star 1 is centered in the field of view. Dimension H is, for example, .0264 inch in this illustration. For this distance grid section C has 15 equal spaces of alternately clear and opaque spacings beginning with a clear spacing from the horizontal center line. Grid section D has 22 equal spaces of alternately clear and opaque spacings and also starting with a clear spacing from the horizontal center line for the same distance (H). Section E has 19 equal spaces and section F has 12 equal spaces of alternately clear and opaque spacings. Sections E and F, however, begin with an opaque stripe from the horizontal center line of the grid 13. It can be observed that the pulse output of a photocell located behind the grid will put out pulses which are not shifted in phase at the crossing of grid sections for this stripe pattern for the trace path shown.

The scan frequency is for example .417 c.p.s. (25 r.p.m.) or it requires 2.4 seconds per scan cycle. Thus, the image takes .6 second to travel the distance H (diagonally). For the different number of stripes in each grid section, the pulse output frequency due to section C is therefore 12.5 c.p.s. Those due to sections D, E, and F are, respectively, 18.4 c.p.s., 15.8 c.p.s. and 10 c.p.s., for the given example. The field of the telescope is moved in a square path having the dimension of trace G at the focal plane. This corresponds to two minutes of arc and the field of view represented by the grid 13 is about 15 minutes of arc. Since a photocell 15 is located behind the grid 13, four different series of pulses are generated in sequence in the photocell output as the star image traces its path around the grid through the different sections. A pulse is produced each time the star image crosses a transparent spacing and, for the grid shown in FIGURE 3, a continuous sequence of pulses is cyclically produced for each scan cycle along path G. Since this system employs frequency discrimination against noise it is desirable, in order to realize maximum performance, to have a star pulse output frequency much higher than the scan frequency. This means that the number of stripes should be a maximum, for a given scan frequency. The width of the stripes is limited by the size of the star image at the grid. Because of this, the source object tracked should yield an image approaching a point. An all reflective optical system (before the grid) is desirable from this standpoint, particularly in view of the very small grid spacings encountered.

Opposite grid sections produce signals which are used to control elevation and azimuth of sighting mirror 2 by up-and-down and left-and-right motions. This is accomplished by the control network shown in block diagram form in FIGURE 1. The control circuitry is given in detail in FIGURE 4. In this figure, the photoelectric cell 15 is shown as the source of the different input pulses, which are actually generated by motion of the star image across grid 13, to the control circuit. The photocell output is coupled by capacitance $C_1$ to the control grid of a tube $T_1$ in amplifier stage 16. A transformer 36 having two primary windings 36a, 36b and four secondary windings 36c, 36d, 36e, 36f has the two primary windings 36a and 36b connected in series in the plate circuit of $T_1$, as shown. The secondaries are each part of separate tuned circuits each having a very narrow frequency band to which it is sensitive. Secondary 36c and capacitance $C_2$ comprise a tuned circuit which is responsive to one grid section frequency, for example, 10 c.p.s. Similarly, secondaries 36d, 36e, and 36f form separate tuned circuits with capacitances $C_3$, $C_4$ and $C_5$ respectively responsive to grid frequencies 12.5, 15.8 and 18.4 c.p.s. These tuned circuits are each responsive to only one of the grid section frequencies and comprise the four channels of filter 17.

The four grid frequencies are grouped in pairs such that opposite grid sections can be used to control vertical (up-and-down) and horizontal (left-and-right) motion by pairing of tuned secondaries. Thus, tuned secondaries 36c and 36d are serially connected and can control vertical motion, these circuits corresponding to opposite grid sections F and C (FIGURE 2) and tunded secondaries 36e and 36f can control horizontal motion, these two circuits corresponding to grid sections E and D, respectively. Each pair of signals is rectified by the rectifier 18 to provide suitable signals for control of elevation and azimuth. The signal developed across a secondary is rectified by a diode. Referring to FIGURE 4, the signal across tuned secondary 36c is rectified by diode $T_2$ and appears as a positive signal at point "m." Resistance $R_1$ in series with the plate of $T_2$ is variable for adjusting the magnitude of the signal at point "m." The same signal across 36c is also rectified by diode $T_3$. Since there is no signal across the tuned secondary 36d at this time, the rectified signal from $T_3$ appears as a negative signal at point "n" (with respect to ground). The value of resistance $R_2$ is chosen such that the signal at point "n" is equal in magitude to that at point "m." When the start image passes from one grid section to the next, a signal is developed across another tuned secondary 36f, for example. This signal is rectified by diodes $T_8$ and $T_9$, similarly as before, and a negative signal appears at point "o" while a positive signal appears at point "p." Following this, the star image enters another grid section and a signal is developed across tuned secondary 36d which is rectified by diodes $T_4$ and $T_5$ and a negative signal appears at point "m" while a positive signal appears at point "n." Assuming that the star was centered in the field of view, the image appears in the next grid section and a signal is developed across tuned secondary 36e which is rectified by diodes $T_6$ and $T_7$ to produce a positive signal at point "o" when a negative signal is produced at point "p." Thus, the rectifier 18 produces signal pairs which are of opposing polarity for the paired secondaries which correspond to opposite grid sections.

The outputs from points m, n, o, and p of rectifier 18 are fed to a phase modulator 19 which has two identical sections, for the elevation and azimuth channels of control. The signal from point "m" is time delayed (filtered) by a resistance $R_3$-capacitance $C_6$ network having a long time constant and connected to a terminal (upper) of a single pole, double throw relay 37. The signal from point "n" is also filtered by an identical RC circuit as above and connected to the other terminal (lower) of relay 37. This relay is energized at a reference signal frequency. In this way, the pole of relay 37 is moved back and forth from positive to negative terminals at the reference frequency. Since the pole is connected to the control grid of tube $T_{10}$ of power amplifier stage 20, the output of amplifier 20 is a signal which is of a phase complying with the relative polarity of upper and lower terminals of relay 37. The tank circuit comprising inductance $L_1$ in parallel with capacitance $C_7$ in the plate circuit of tube $T_{10}$ converts the essentially square wave input into a sine wave output from amplifier 20. This sinusoidal signal is applied to one phase of the two-phase servomotor 4. The other phase winding is connected to the reference signal 28 of the same frequency but differing by 90 degrees in phase to the signal energizing relay 37. The signal used to energize relay 37 (and relay 38) is actually a phase shifted square wave derived from the same reference signal 28 applied to the reference fields of servomotors 4 (and 6).

Figure 3:
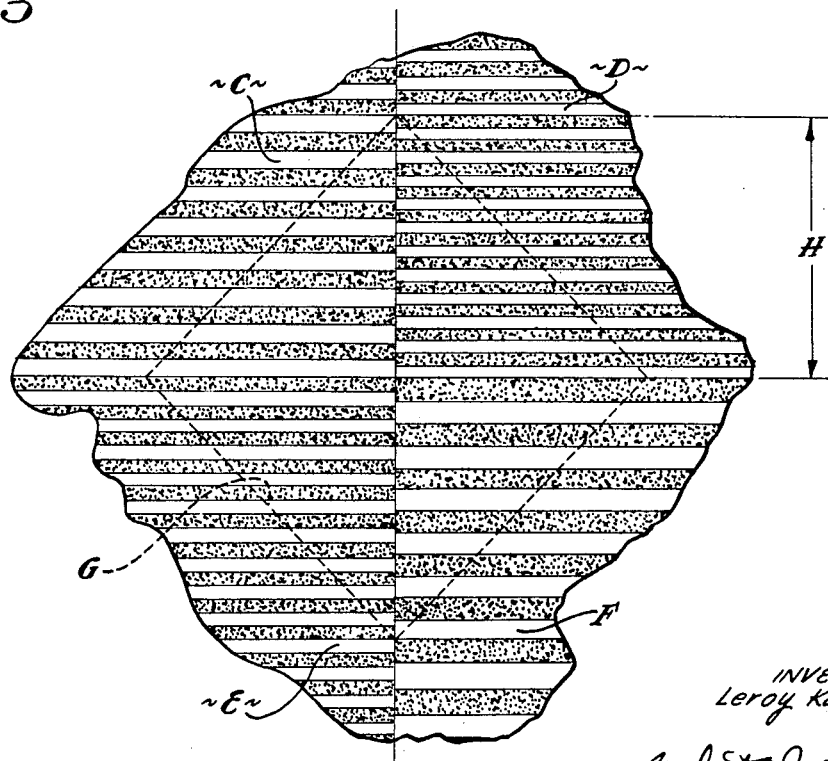
FIGURE 3 is a fragmentary, frontal view of a multiple section grid, further enlarged, to show clearly the grid pattern and a path traced thereon by a star image when the star is centered in the field of view.

Relay 38 is identical to relay 37, as is tube $T_{11}$, of power amplifier 22 identical to tube $T_{10}$. The connection between power amplifier 22 and the two-phase servomotor 6 is also the same as that between amplifier 20 and servomotor 4. The servomotors are actuated when there are outputs from the power amplifiers. The direction of output shaft rotation of a servomotor depends upon the phase of the output signal from the power amplifier applied to the motor as compared with the reference signal applied. When the output signal has a 90 degree phase with the reference signal the motor will turn in one direction and when the output signal has a 270 degree phase with the reference signal, the motor will rotate in the opposite direction. Since the terminals of the relay 37 have a 90 degree phase with the reference signal for an output from one of the tuned secondaries and 270 degree phase with the reference signal for the other of the tuned secondaries for the vertical (elevation) control, these two signals cancel the effect of the other each scan cycle. This is the case when the star image traces a path across each of the corresponding (opposite) grid sections for equal time durations. If the star is off center in a vertical direction (with respect to the sighting mirror) only, the trace on the grid is displaced such that the center of the square trace is shifted from the center of the grid diagonally into a section controlling vertical motion, say, for example, into grid section F (FIGURE 3). The result is that the signals due to grid section C and F no longer cancel each other each scan cycle. Consequently, the output from power amplifier 20, by action of relay 37, puts out a signal of a phase which causes motor 4 to drive the sighting mirror 2 about the Y axis (FIGURE 1) such that the center of the trace is brought back to the center of the grid and equal outputs are secured from all four grid sections.

The outputs of rectifier 18 are also fed to the detector 33 which is comprised mainly of a set of diodes $T_{12}$, $T_{13}$, $T_{14}$ and $T_{15}$ connecting the outputs of rectifier 18 to a common load resistance $R_4$, as shown. A diode will conduct when its cathode connection is negative as will be the case in at least one diode when the star (image) is in the field of view.

The signal across resistance $R_4$ is applied through a resistance $R_5$-capacitance $C_8$ network having a long time constant to the control grid of tube $T_{16}$. Thus, when the point source is outside the field of view, none of the diodes will conduct. This condition then actuates relay 39 which has a control coil in the plate circuit of tube $T_{16}$. This action energizes the track-no track control 34 to begin a search procedure with auxiliary equipment. The signal across resistance $R_4$ is also filtered and connected back to the grid resistance $R_6$ of amplifier 16 to ensure an output signal of a fairly constant magnitude to the transformer 36. When a negative voltage exists across $R_4$ (image is in the field of view), this signal is used to bias amplifier 16 to reduce the gain and conversely to increase the gain when the signal is weakened.

Scan generator 24 produces the signals which drive the oscillating mirror assembly 7 and also the signal that actuates relays 37 and 38. These signals are generated by a synchronous motor 40 having a cam 41 affixed to the output shaft and, in addition, gearing 42, as shown, to operate means for producing the proper scan waveforms. Cam 41 is shaped such that switch 43 is actuated for one half of a revolution of the output shaft. The motor 40 runs at the reference signal frequency and cam 41 is adjusted to operate switch 43 at a 90 degree phase angle with the reference signal. Whenever switch 43 is operated (closed) current from a D.C. power supply 44 flows to energize relays 37 and 38. Thus a square wave of the proper frequency and phase is supplied to relays 37 and 38. It is evident that a capacitance can be connected in series with the reference signal phase winding of each servomotor 4 and 6 whereby relays 37 and 38 can be replaced by A.C. relays, the coils of which can be connected directly to the A.C. supply reference signal. This practice would eliminate the need of cam 41, switch 43 and D.C. supply 44 and is desirable in many instances. Mirror assembly 7 is motivated by signals produced from two sawtooth potentiometers 45 and 46 which are driven by gearing 42. A regulated voltage supply 47 impresses 6 volts D.C. across two opposite points of each circular resistance loop 45a and 46a of the potentiometers. An output is secured across a set of two isolated wipers 45b and 46b, respectively, of each potentiometer, the wipers of each set being separated by 180 degrees, both wipers being rotated around each loop by the gearing 42. The outputs of these potentiometers 45 and 46 are filtered and applied to actuating coils 7b in series with 7c and 7d in series with 7e, respectively, of oscillating mirror assembly 7. Resistances $R_7$ and and $R_8$ are used to adjust the magnitude of output voltage. The diametrical wipers of sawtooth potentiometer 45 bear an instantaneous position orientation of 90 electrical degrees difference from those of potentiometer 46 to produce waveforms 48 and 49 in the coils of assembly 7 having the phase relation shown.

Scan generator 24 produces accurate voltage waves of nearly 12 volts, peak-to-peak, which are applied to the coils in mirror assembly 7. There are schematically shown four coils which are actually attached to the back of mirror 7a equally spaced under the center of each quadrant and positioned over separate permanent magnets 7f, 7g, 7h, and 7i. Opposite coils are connected in series to form two coil pairs, 7b, 7c and 7d, 7e, each pair determining an axis of oscillation. These two coil pairs, when energized, react with their respective magnets 7f, 7g and 7h, 7i causing mirror 7a to tilt in a vertical (up-and-down) and horizontal (left-and-right) direction on application of the exciting input waves. The directions are relative to star sighting. The amount of mirror deflection or tilt follows precisely the input voltages 48 and 49.

The automatic multiple grid scanning tracker can easily track a 2nd magnitude star to within 30 degrees from the sun with a 30 second time constant control circuit (provided largely by the filters such as $R_3$ and $C_6$) and a 15 minute of arc field with a signal to noise ratio of at least 4 to 1. This result was achieved with a 1P21 (blue-sensitive) photocell. A lead sulfide cell (red-sensitive) is preferably used with an all reflective optical system before the grid because of a larger diffraction disk produced by the longer red wavelength involved with the lead sulfide cell. Laboratory tests have shown that the tracker operates equally well during either daytime or nighttime with a lead sulfide cell. This is by reason of the highly selective characteristics of the lead sulfide photocell. The tracker can operate when there is more than one star in the field. When there are two stars in the field, diametrically opposed, for example, the brighter star is tracked because the average signal is predominantly influenced by this star.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. Means for the automatic tracking of a radiant point source object comprising: reflecting means for sighting a selected radiant point source object, said reflecting means positionable in elevation and azimuth; optical means cooperating with said reflecting means for focusing the image of said radiant point source on a focal plane; means for displacing said image to trace a path on said focal plane; means having a plurality of differing sections located at said focal plane for interrupting said image as it traces said path on said focal plane; photosensitive means for generating a pulse output according to the interruption of said image; amplifying means for amplifying said pulse output; means for filtering said pulse output, said filter means having a plurality of channels each responsive only to a portion of said pulse output corresponding to respective sections of said interrupting means; means for rectifying the output signals of said filter channels; means for modulating the output signals of said rectifying means at a reference signal frequency to produce A.C. output signals; and means independently responsive to said A.C. output signals to position said reflecting means in elevation and azimuth to continuously track said source object.

2. Apparatus in accordance with claim 1 wherein said optical means includes reflecting surfaces only and said photosensitive means is infrared sensitive.

3. Apparatus in accordance with claim 1 wherein said means for interrupting said image includes a stationary square grid having a plurality of uniform sections, each said section divided into a different number of clear and opaque spacings of different width from the spacings of the other sections.

4. Apparatus in accordance with claim 1 wherein said means for displacing said image includes an oscillating mirror having two degrees of freedom, said osscillating mirror activated to displace said image to trace a closed path on said focal plane.

5. Apparatus in accordance with claim 1 wherein said filtering means include a plurality of tuned circuits, each said tuned circuit responsive to the pulse output frequency corresponding to respective sections of said interrupting means.

6. Apparatus in accordance with claim 1 wherein said rectifying means include diodes connected to provide a positive and a negative signal from an output signal of said filter channels.

7. Apparatus in accordance with claim 1 wherein said modulating means include single pole, double throw relays connected to the output of said rectifying means to provide A.C. signals of a reference frequency from said rectified signals, said relays operated at the reference frequency.

8. Apparatus in accordance with claim 1 including means having a long time constant for filtering the output of said rectifying means.

9. In an automatic star tracker having optical means for perceiving and focusing on a focal plane the image of a selected star, scanning means comprising: an oscillating mirror having two degrees of freedom; and a stationary square grid positioned in said focal plane, said grid divided into four equal square sections having a plurality of alternate clear and opaque spacings parallel to an edge of said grid, said sections having different width spacings and said image being traced by said oscillating mirror in a path diagonally across said square sections, whereby the transmission of said image is periodically interrupted by said opaque spacings of each grid section as said image traces said path around said grid.

10. Apparatus in accordance with claim 9 including scan generator means for actuating said oscillating mirror in its two degrees of freedom to linearly displace said image in a square path on said focal plane, said scan generator means comprising two linear sweep outputs at 90 electrical degrees to each other.

11. Apparatus in accordance with claim 10 including azimuth and elevation driving means for said tracker, means for selecting between a plurality of separately existing driving signals to said driving means, and means for operating said selecting means in predetermined phase relation with said scan generator means, whereby signals provided by said oscillating mirror are synchronized with the driving signals to properly operate said driving means.

12. Means for the automatic tracking of a radiant point source object, comprising: means for sighting and focusing on a focal plane the image of a selected radiant point source object; means for displacing said image to trace a path on said focal plane; a stationary, multiple-section grid having opaque and clear spacings located at said focal plane for interrupting said image to produce a periodic multiple frequency light signal at all times; photosensitive means located behind said grid for generating an electrical pulse output in accordance with said periodic light signal; means for interpreting said pulse output; and means for orienting said sighting means according to the interpretation of said pulse output.

13. In an automatic star tracker having optical means for perceiving and focusing on a focal plane the image of a selected star, scanning means comprising: means for displacing said image to trace a closed path on said focal plane; a stationary light-interrupting grid at said focal plane having a plurality of grid sections, each grid section having a plurality of alternately clear and opaque spacings parallel to a common edge of said grid, the spacings within each individual section being equal in width but of a different width than the spacings of all other sections, whereby when said image path passes sequentially through said grid sections, a periodic light signal of correspondingly differing sequential frequencies is produced.

References Cited in the file of this patent

UNITED STATES PATENTS 2,462,925     Varian _____ Mar. 1, 1949